US011724454B2

(12) United States Patent
Sergison

(10) Patent No.: US 11,724,454 B2
(45) Date of Patent: Aug. 15, 2023

(54) GANTRY CARRIAGE ASSEMBLY WITH CONTOURED GUIDE WHEELS

(71) Applicant: Caterpillar Inc., Peoria, IL (US)

(72) Inventor: Daniel Peter Sergison, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 223 days.

(21) Appl. No.: 17/192,643

(22) Filed: Mar. 4, 2021

(65) Prior Publication Data

US 2022/0281170 A1   Sep. 8, 2022

(51) Int. Cl.
| | |
|---|---|
| *B29C 64/245* | (2017.01) |
| *B29C 64/227* | (2017.01) |
| *B66C 5/02* | (2006.01) |
| *B33Y 30/00* | (2015.01) |
| *B28B 1/00* | (2006.01) |
| *B28C 9/04* | (2006.01) |

(52) U.S. Cl.
CPC ............ *B29C 64/245* (2017.08); *B28B 1/001* (2013.01); *B28C 9/04* (2013.01); *B29C 64/227* (2017.08); *B66C 5/02* (2013.01); *B33Y 30/00* (2014.12)

(58) Field of Classification Search
CPC ..... B29C 64/20; B29C 64/245; B29C 64/227; B33Y 30/00; B28B 1/00; B66C 5/02; B66C 7/08; B66C 9/08
See application file for complete search history.

(56) References Cited

U.S. PATENT DOCUMENTS

| | | | |
|---|---|---|---|
| 2009/0127348 A1* | 5/2009 | Schroeder | F16C 29/005 238/148 |
| 2014/0076192 A1* | 3/2014 | Hurd | F16M 11/045 104/165 |

(Continued)

FOREIGN PATENT DOCUMENTS

| | | |
|---|---|---|
| AT | 394989 B | 8/1992 |
| DE | 3425682 A1 * | 1/1986 |

(Continued)

OTHER PUBLICATIONS

Written Opinion of the ISA and International Search Report for Int'l Patent Appln. No PCT/US2022/016506, 11 pgs. (dated Jun. 8, 2022).

(Continued)

*Primary Examiner* — Jerzi H Moreno Hernandez
(74) *Attorney, Agent, or Firm* — Lee & Hayes, P.C.

(57) ABSTRACT

A gantry carriage assembly includes a support plate having a first end and a second end. The gantry carriage assembly further includes first guide wheels secured to a first end of the support plate, the first guide wheels including a first pair of guide wheels configured to accommodate a longitudinal member of a gantry truss therebetween, where the first pair of guide wheels are disposed opposite from one another across the longitudinal member. The gantry carriage assembly also includes second guide wheels secured to a second end of the support plate opposite the first end, the second guide wheels including a second pair of guide wheels configured to accommodate the longitudinal member of the gantry truss therebetween, wherein the second pair of guide wheels are disposed opposite from one another across the longitudinal member.

19 Claims, 5 Drawing Sheets

(56) References Cited

U.S. PATENT DOCUMENTS

| | | | |
|---|---|---|---|
| 2017/0151704 A1 | 6/2017 | Go et al. | |
| 2018/0147782 A1 | 5/2018 | Kobayashi et al. | |
| 2018/0147786 A1 | 5/2018 | Hakkaku et al. | |
| 2018/0169944 A1 | 6/2018 | Hofmann et al. | |
| 2019/0329279 A1* | 10/2019 | Haustein | C23C 14/568 |
| 2020/0282593 A1 | 9/2020 | Le Roux | |
| 2022/0032500 A1* | 2/2022 | Bramberger | B33Y 30/00 |

FOREIGN PATENT DOCUMENTS

| | | |
|---|---|---|
| EP | 0152362 A2 | 8/1985 |
| WO | WO2019022771 A1 | 1/2019 |

OTHER PUBLICATIONS

Marine Corps Systems Command—3D-Printed Concrete Barracks Robotic Construction Research, Apr. 10, 2018, retrived from <https://www.youtube.com/watch?v=9S1kxvpgFCk> on Mar. 4, 2021.

US military 3D prints concrete barracks on site, Sep. 5, 2018, retrieved from <https://www.dezeen.com/2018/09/05/us-military-3d-prints-concrete-barracks-on-site-technology/> on Mar. 4, 2021.

\* cited by examiner

GANTRY CARRIAGE ASSEMBLY WITH CONTOURED GUIDE WHEELS

TECHNICAL FIELD

The present disclosure relates to a gantry carriage assembly having guide wheels. More specifically, the present disclosure relates to a gantry carriage assembly for use in a three-dimensional additive construction system that supports a gantry bridge such that the gantry bridge is moveable along a gantry frame of the three-dimensional additive construction system. The gantry carriage assembly includes guide wheels that engage the gantry frame, thereby allowing the gantry carriage assembly and the gantry bridge to be moveable on the gantry frame.

BACKGROUND

Three-dimensional ("3D") additive systems are used in a variety of applications to form various types of parts, systems, or structures. 3D additive systems and processes enable creation of parts that can be lighter, stronger, or more complex than parts formed by traditional manufacturing processes. Furthermore, 3D additive systems can form parts in a more continuous manner than traditional manufacturing processes.

As products formed using 3D additive techniques increase in size, the 3D additive systems used to form such products can also increase in size. For example, 3D additive systems have been used to fabricate buildings or other structures and/or structural components. Such 3D additive systems require support structures to which 3D additive components can be secured and on which the 3D additive components are moveable during a 3D additive manufacturing process. Moreover, fabricating buildings and other similar structures may best be done at the final site of the building, e.g., such that the completed structure need not be transported after construction.

An example 3D additive construction system is described in U.S. Patent Pub. No. 2020/0282593 (hereinafter referred to as the '593 reference). In particular, the '593 reference describes a construction system that can utilize additive manufacturing processes to produce 3D additive products or structures. The '593 reference describes a construction system having a pair of rail assemblies, a gantry movably disposed on the rail assemblies, and a printing assembly moveably disposed on the gantry. The gantry described in the '593 reference includes a vertical support assembly including a plurality of rollers coupled to a lower support frame that includes multiple rollers. The rollers of the '593 reference are configured to engage with an aligned angle member of rail segments included in a rail assembly. The rail assembly forms tracks to guide movement of the gantry. The '593 reference describes that the rollers each include a v-shaped channel that is shaped to engage with the angle member. However, the v-shaped grooves of the rollers described in the '593 reference are unable to prevent uplift of the rollers if the gantry is subject to a certain upward and/or rotational force. As such, the rollers described in the '593 reference can be prone to derailment. Furthermore, the v-shaped channel and the angle member can be subject to scrubbing (or other wearing forces) and can wear unevenly, which could negatively impact the life and/or function of the rollers and/or the rail assembly.

Example embodiments of the present disclosure are directed toward overcoming the deficiencies described above.

SUMMARY

An example gantry carriage assembly includes a support plate having a first end and a second end. The gantry carriage assembly further includes first guide wheels secured to a first end of the support plate, the first guide wheels including a first pair of guide wheels configured to accommodate a longitudinal member of a gantry truss therebetween, where the first pair of guide wheels are disposed opposite from one another across the longitudinal member. The gantry carriage assembly also includes second guide wheels secured to a second end of the support plate opposite the first end, the second guide wheels including a second pair of guide wheels configured to accommodate the longitudinal member of the gantry truss therebetween, wherein the second pair of guide wheels are disposed opposite from one another across the longitudinal member.

An example gantry carriage assembly moveable along a gantry frame assembly and configured to support a gantry bridge. The gantry carriage assembly includes a support plate slidable along the gantry frame assembly and configured to support the gantry bridge, the support plate having a first end and a second end. The gantry carriage assembly further includes one or more guide wheels secured to a first end of the support plate, the one or more guide wheels including at least two guide wheels spaced radially from one another by a straight angle, wherein at least one guide wheel of the one or more guide wheels includes a wheel profile shaped such that the at least one guide wheel includes at least two points of contact on a longitudinal member of the gantry frame assembly, the at least two points of contact being tangential to a surface of the longitudinal member, respectively.

In a further example, a three-dimensional additive construction system includes a gantry frame assembly including one or more gantry trusses, a gantry bridge assembly including a trolley moveable along the gantry bridge, the trolley being configured to secure a supply hose thereto, and a gantry carriage assembly secured to a gantry truss of the one or more gantry trusses such that the gantry carriage assembly is moveable along the gantry truss. The gantry carriage assembly includes a support plate having a first end and a second end. The gantry carriage assembly further includes first guide wheels secured to a first end of the support plate, the first guide wheels including a first pair of guide wheels configured to accommodate a longitudinal member of a gantry truss therebetween, where the first pair of guide wheels are disposed opposite from one another across the longitudinal member. The gantry carriage assembly further includes second guide wheels secured to a second end of the support plate opposite the first end, the second guide wheels including a second pair of guide wheels configured to accommodate the longitudinal member of the gantry truss therebetween, wherein the second pair of guide wheels are disposed opposite from one another across the longitudinal member.

DETAILED DESCRIPTION

This disclosure generally relates to a three-dimensional ("3D") additive system (referred to herein as "the system"). The system described herein is used to construct various types of structures, portions of structure(s), or other products utilizing additive manufacturing processes. Such additive manufacturing processes may enable construction of structures and/or portions thereof more economically and/or quicker when compared with traditional construction processes of like structures and/or portions thereof. Typically, additive manufacturing processes deposit an extrudable building material in vertically stacked layers to form the structure and/or portions thereof. As such, the system requires a support structure that is capable of supporting a gantry bridge that moves along the support structure during an additive manufacturing process. In implementations, the support structure facilitates relatively free movement of a supply hose, e.g., in x-, y-, and z-directions, to accomplish the construction.

Figure 1:
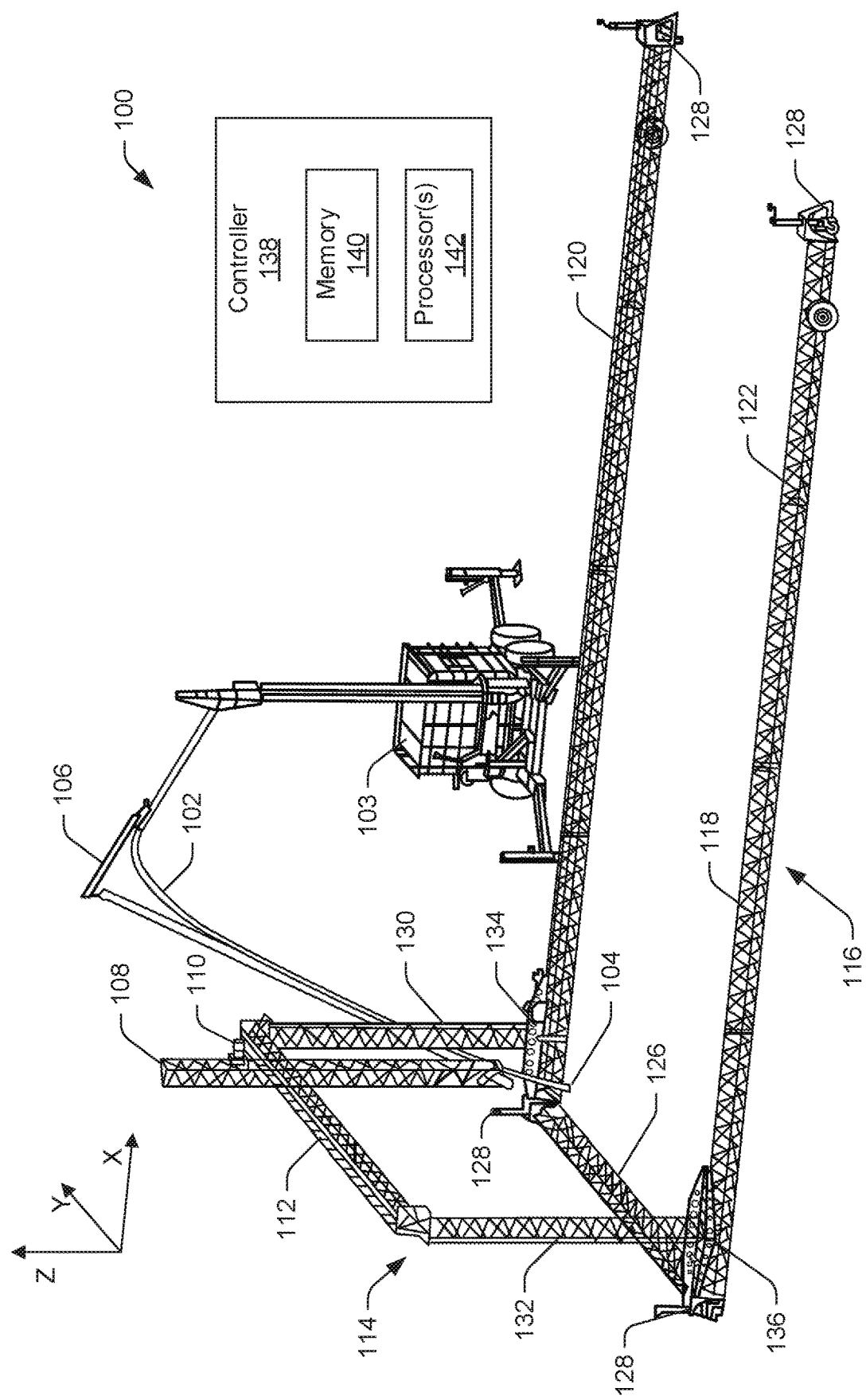
FIG. 1 is a perspective view of an example three-dimensional additive system in accordance with an example of the present disclosure.

FIG. 1 depicts a perspective view of an example 3D additive system 100 (referred to herein as "the system 100"). As mentioned previously, the system 100 may be used to construct various types of structures, portions of structure(s), or other products utilizing an additive manufacturing process. For example, in an additive manufacturing process, an extrudable material is conveyed through a conduit 102 to be deposited, delivered, or otherwise conveyed in a desired location. The conduit 102 guides deposition of the extrudable material such that the extrudable material may be vertically stacked in layers to form the structure and/or portions thereof. In some examples, the conduit 102 includes hoses, pipes, or other types of conduit that are configured to convey the extrudable material (or components thereof) from a source to the desired deposition location to a desired deposition site (e.g., a construction site). Furthermore, the conduit 102 may include a nozzle 104 located at an end of the conduit 102. The nozzle 104 may be configured to at least partially control flow rate of the extrudable material during an additive manufacturing process.

The source (not shown) of the extrudable material may include a mixer, hopper, tank, vessel, etc. that is configured to prepare, store, and/or contain a volume of extrudable material. Furthermore, the system 100 may include one or more containers 103. The containers 103 store a volume of water or other liquid that may be used during an additive manufacturing process. In some examples, water may be added to the extrudable material while the extrudable material is pumped during the additive manufacturing process. Furthermore, the containers 103 may store a volume of a liquid additive that may be added to the extrudable material while the extrudable material is pumped during the additive manufacturing process. Additionally, and/or alternatively, water or other liquid from the containers 103 may be mixed with a raw material (e.g. cement) to form the extrudable material and the extrudable material is then pumped through the conduit 102 and deposited. In some examples, the containers 103 and the liquid stored therein may act a ballast weight for the conduit 102. Furthermore, the containers 103 may be replaced with weights (e.g., sand bags or other ballast weight) or a pump configured to pump the extrudable material.

As shown in FIG. 1, the conduit 102 may be attached to a boom system 106 (referred to herein as "the boom") that is configured to convey the conduit 102 such that the conduit 102 avoids contact with portions of structure that has previously been extruded (or otherwise formed). For example, the boom 106 may facilitate movement of the conduit 102 in a vertical and/or horizontal direction such that the nozzle 104 of the conduit 102 may be positioned in a desired location for depositing the extrudable material, while the remainder of the conduit 102 avoids contact with obstacles (such as portions of a structure or other product that was previously formed). The boom 106 of the system 100 is adjustable in various directions to allow the nozzle 104 of the conduit 102 to be positioned in any location within the system 100. Additionally, the boom 106 may allow the conduit 102 and nozzle 104 to be positioned outside of the system 100 in order to clean, repair, and/or replace the conduit 102 and/or the nozzle 104.

In some examples, the extrudable material may be a cement mixture. Additionally, and/or alternatively, the extrudable material may include other types of extrudable materials that may be used in an additive manufacturing process to form a structure and/or portions thereof.

In some examples, a portion of the conduit 102 that is proximate the nozzle 104 is secured to an end of a gantry truss 108. The gantry truss 108 may extend in a substantially vertical direction (e.g., the z-direction in FIG. 1) and may be secured by or coupled to a trolley 110. The trolley 110 may be configured to adjust a position of the gantry truss 108, thereby positioning the conduit 102 and nozzle 104 in a desired location. For example, the trolley 110 may include guide wheels and one or more motors (the guide wheels and motors are shown and described further herein below) that are configured to move the gantry truss 108 in one or more directions sequentially or simultaneously. In some examples, the wheel profile of the guide wheels of the trolley 110 are the same as the profile of the guide wheels shown and described with respect to FIGS. 2-4. For example, the trolley 110 may be configured to adjust a position of the gantry truss 108 in a vertical direction (or along a "Z" direction). As a vertical position of the gantry truss 108 is adjusted by the trolley 110 (via the motor and guide wheels), the position of the conduit 102 and nozzle 104 are also adjusted vertically. Furthermore, the trolley 110 is configured to adjust a position of the gantry truss 108 in a horizontal (or along a "Y" direction). For example, the guide wheels and one or more motors are configured to move the trolley 110 along a horizontal truss 112 of a gantry bridge assembly 114 (referred to herein as "the gantry bridge 114"). As the trolley 110 moves along the horizontal truss 112, the gantry truss 108 secured by the trolley 110 is also translated in the Y direction. As such, a position of the conduit 102 and the nozzle 104 may be adjusted by the trolley 110 that is secured to and movable along the gantry bridge 114.

The system 100 further includes a gantry frame assembly 116 (referred to herein as "the gantry frame 116"). The gantry frame 116 may comprise multiple components coupled to form a generally horizontal, substantially U-shaped frame. More specifically, the gantry frame 116 is illustrated as including gantry trusses 118 that form a first length 120 of the gantry frame 116. In some examples, the first length 120 may be formed from a single gantry truss 118 or the first length 120 may be formed by multiple gantry trusses 118 that are coupled (e.g., fastened) to each other. The gantry frame 116 further includes gantry trusses 118 that form a second length 122 of the gantry frame 116 spaced from the first length 120. The second length 122 of the gantry frame 116 may be formed by a single gantry truss 118 or the second length 122 may be formed by multiple gantry trusses 118 that are coupled (e.g., fastened) to each other. In some examples, the first length 120 of the gantry frame 116 extends in a direction that is substantially parallel to a direction of extension of the second length 122 of the gantry frame 116. Furthermore, the first length 120 and the second length 122 may be substantially equal such that the first length 120 and the second length 122 are within a predetermined tolerance (e.g., +/−6 inches) of each other.

Furthermore, the first length 120 of the gantry frame 116 is spaced apart from the second length 122 of the gantry frame 116 by a distance that forms a width of the gantry frame 116. For example, the gantry frame 116 includes one or more additional gantry trusses 118 that form a first width 126 of the gantry frame 116. The first width 126 of the gantry frame 116 may be formed by a single of the gantry trusses 118 or multiple gantry trusses 118 that are connected (or fastened) to each other. Furthermore, the first width 126 of the gantry frame 116 is connected to ends of the first length 120 and the second length 122 of the gantry frame 116, thereby connecting the first length 120 and the second length 122 of the gantry frame 116. Accordingly, the gantry frame 116 includes a plurality of the gantry trusses 118 comprising the first length 120, the second length 122 and the first width 126, making the gantry frame 116 substantially U-shaped. As will be appreciated, during operation of the system 100, a building or other structure made using the 3D additive processes described herein may be formed within a footprint of the gantry frame 116.

In some examples, the gantry frame 116 may further include instances of the gantry trusses 118 that form a second width (not shown in FIG. 1) of the gantry frame 116. The second width of the gantry frame 116 is located at an end of the first length 120 and the second length 122 that is opposite the first width 126. When provided, the gantry trusses 118 forming the second width configure the gantry frame 116 as a substantially rectangular frame. In some examples, the first width 126 and/or the second width may be removed once a structure or portion thereof is completed in order to remove the system 100 from a location of the completed structure.

The system 100 may include one or more jacks 128 attached to and located at various locations on the gantry frame 116. The jacks 128 may be adjustable to alter a vertical position of the gantry frame 116. In some examples, the jacks 128 may include wheels that contact a surface on which the system 100 rests when the jacks 128 are adjusted, e.g., to extend the wheels past a base of the jacks 128. Thus, a position of the system 100 may be adjusted via the wheels of the jacks 128. While FIG. 1 depicts the system 100 as having four jacks 128 located at corners of the gantry frame 116, the system 100 may include more than or fewer than four jacks 128 located at similar or different locations on the gantry frame 116.

In some examples, the horizontal truss 112, the gantry truss 108 secured by the trolley, and the gantry trusses 118 of the gantry frame 116 may include a same or similar type of gantry truss. For example, the horizontal truss 112, the gantry truss 108 secured by the trolley 110 and the gantry trusses 118 may be triangular shaped trusses (or "triangular trusses"). The triangular trusses may include three longitudinal members that are connected via one or more horizontal members, diagonal members, etc. Alternatively, in some examples, the gantry trusses used in the system 100 may include a different shape or configuration. These and other components of the gantry trusses 112, 108, and 118 are shown and described further herein with respect to FIG. 2.

As mentioned previously, the system 100 includes a gantry bridge 114. As shown in FIG. 1, the gantry bridge 114 is at least partially supported by the gantry frame 116. For example, the gantry bridge 114 includes the horizontal truss 112 that spans a distance between and is coupled on opposite ends to a first vertical truss 130 and a second vertical truss 132. In some examples, the first vertical truss 130 is at least partially supported by (and is coupled to) the first length 120 of the gantry frame 116 and the second vertical truss 132 is at least partially supported by (and is coupled to) the second length 122 of the gantry frame 116. For example, the first vertical truss 130 may be attached to a first carriage assembly 134 that is movably secured to the first length 120 of the gantry frame 116. The first carriage assembly 134 may be attached to the first length 120 of the gantry frame 116 via guide wheels that allow the first carriage assembly 134 to be movable along the first length 120 of the gantry frame 116. Similarly, the second vertical truss 132 may be attached to a second carriage assembly 136 that is movably secured to the second length 122 of the gantry frame 116. The second carriage assembly 136 may be attached to the second length 122 of the gantry frame 116 via guide wheels that allow the second carriage assembly 136 to be movable along the second length 122 of the gantry frame 116. The first carriage assembly 134 and the second carriage assembly 136 may include guide wheels that are configured to reduce wear on components of the system 100, mitigate uplift of the carriage assemblies 134 and 136, mitigate potential debris buildup, among other potential benefits.

The system 100 may also include a controller 138 that is configured to control various operations of the system 100. For example, the controller 138 controls motors included in the system 100 that are configured to move various components (e.g., carriage assemblies) of the system 100 during an additive manufacturing process. The controller 138 may also control a pump or pump system (not shown) that is configured to pump the extrudable material through the conduit 102 during the additive manufacturing process. The controller 138 may control these and other functions of the system 100.

In some examples, the controller 138 includes, for example, a microcontroller, memory (e.g., RAM), storage (e.g., EEPROM or Flash) configured to perform the described functions of the controller 138. The controller 138 controls at least a portion of the operations of the system 100 including operation of the motors (which are shown and described further herein below). Instead of, or in addition to, an ECM/ECU the controller 138 may include a general computer microprocessor configured to execute computer program instructions (e.g., an application) stored in memory 140 to perform the disclosed functions of the controller 138. As mentioned, the controller 138 includes a memory, a secondary storage device, processor(s), and/or any other computing components for running an application. Various other circuits may be associated with controller 138 such as power supply circuitry, signal conditioning circuitry, or solenoid driver circuitry. In some examples, the controller 138 and/or a portion of components of the controller 138 may be located remotely from the system 100 and may be communicatively coupled to the system 100. For example, the controller 138 may include any suitable assembly and/or device that receives and/or transmits signals to other devices. The controller 138 may include one or more processors 142 executes machine readable instructions provided from the memory 140 that enable the functionality of the processors 142 and/or the controller 138. These and other features of the system 100 are described further herein with respect to FIGS. 2-6.

Figure 2:
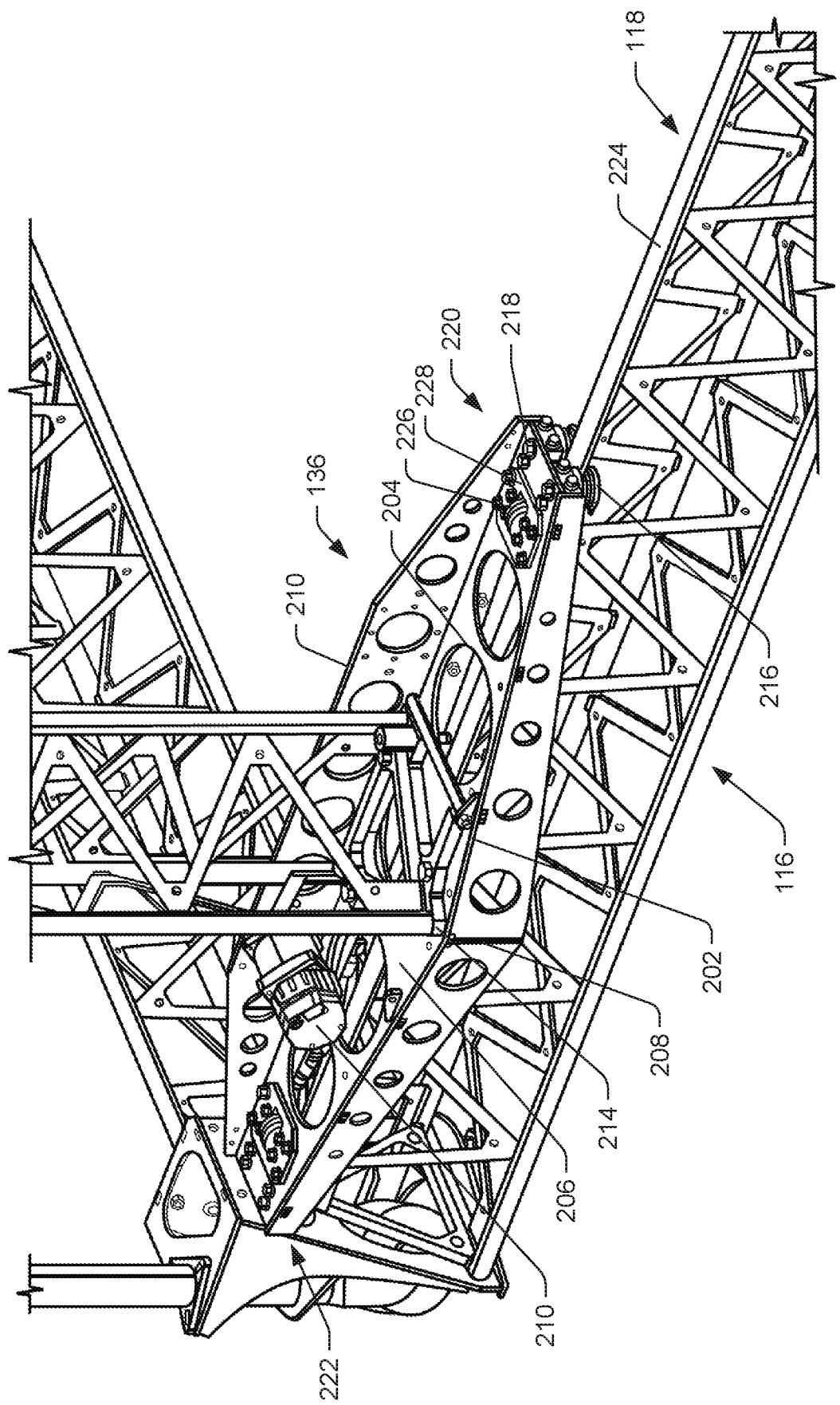
FIG. 2 is a perspective view of an example gantry carriage assembly of a three-dimensional additive system in accordance with an example of the present disclosure.

FIG. 2 is a perspective view of the second carriage assembly 136 of the system 100 shown and described with respect to FIG. 1. While describing features of the second carriage assembly 136 with respect to FIG. 2, it is to be understood that the second carriage assembly 136 and the first carriage assembly 134 may include substantially similar features. Furthermore, for ease of explanation, the second carriage assembly 136, as shown and described in FIG. 2, will be referred to as "the carriage assembly 136".

The carriage assembly 136 includes a body 202 of the carriage assembly 136. The body 202 of the carriage assembly 136 may be formed from a metallic material such as stamped sheet metal or other metal material. In other implementations, the body 202 may be formed from other rigid and load-bearing materials. As shown in FIG. 2, the body 202 may include one or more apertures 204 therein. The apertures 204 may reduce a weight of the body 202 while maintaining strength of the body 202, may provide mounting features for components of the carriage assembly 136, and/or may provide access to components of the carriage assembly 136 and/or the system 100, as detailed further herein. The body 202 also includes a plate 206 that forms a horizontal surface of the body 202. The plate 206 provides a structure to which other components may be mounted to form the carriage assembly 136. For instance, as shown in FIG. 1, the body 202 further includes an exterior flange 208 and an interior flange 210 secured to opposite sides of the plate 206. The exterior flange 208 and the interior flange 210 may provide additional structural support to the body 202 of the carriage assembly 136. In some examples, a motor 212 may be attached to the interior flange 210 of the body 202 via an aperture through the interior flange 210. The motor 212 may include an electric motor that is controlled via a system controller (e.g., the controller 138) or other component. The motor 212 may include wheels, gears, pulleys, other mechanisms that are configured to engage with a drive system of the carriage assembly 136 to move the carriage assembly 136 along the first length 120 and the second length 122 of the gantry frame 116. In some examples, each carriage assembly (i.e., the first carriage assembly 134 and the second carriage assembly 136) may include a motor that is configured to move the carriage assemblies 134 and 136 along the gantry frame 116. The carriage assembly 136 further includes a mounting plate 214 that is attached to the plate 206 of the carriage assembly 136. In some examples, the second vertical truss 132 is attached to the carriage assembly 136 via the mounting plate 214.

The carriage assembly 136 further includes guide wheels 216 coupled to the plate 206 of the carriage assembly 136. In some examples, the guide wheels 216 are secured to the plate 206 in a manner to rotate freely as the carriage assembly 136 is moved along the gantry frame 116. As shown in FIG. 2, the carriage assembly 136 includes two guide wheels 216 secured proximate a first end 220 of the plate 206. Although not visible in FIG. 2, the carriage assembly may also include a pair of guide wheels proximate a second end 222 of the plate 206. Additional pairs of guide wheels may also be provided along a length of the body 202. The guide wheels 216 are configured to accommodate (i.e., clamp or otherwise secure) a longitudinal member 224 of the gantry truss 118 between a pair of guide wheels 216 that are disposed on opposite sides of the longitudinal member 224. In some examples, the guide wheels 216 include a concave wheel profile that is shaped such that individual guide wheels 216 include at least two points of contact on the longitudinal member 224. The two points of contact may be tangential to a surface of the longitudinal member 224. In some examples, the pair of guide wheels 216 located on either side of the longitudinal member 224 may include an axis of rotation that is substantially vertical. The guide wheels 216 may be formed from metal, nylon, polymer, or other suitable materials. As mentioned previously, the gantry trusses 118 may include triangular shaped trusses. For example, the gantry trusses 118 include three longitudinal members that are connected via one or more horizontal members, diagonal members, helical members, etc. In some examples, the carriage assembly 136 is movable coupled to a single longitudinal member (e.g., longitudinal member 224) of the three longitudinal members. As such, the pair of guide wheels 216 may include more contact points on a longitudinal frame member of the gantry truss 118 when compared to systems implemented with square shaped gantry trusses.

In some examples, the carriage assembly 136 further includes a top guide wheel 226 that is secured to a portion of the plate 206 such that the top guide wheel 226 contacts a top surface of the longitudinal member 224. For example, the top guide wheel 226 is coupled to a plate 228 that is coupled to the body 202 of the carriage assembly 136. The top guide wheel 226 is coupled to the plate 228 such that the top guide wheel 226 extends below a plane defined by the plate 206 such that the top guide wheels rests on a top surface of the longitudinal member 224. In some examples, the carriage assembly 136 includes a top guide wheel 226 proximate the first end 220 of the carriage assembly and a top guide wheel proximate the second end 222 of the carriage assembly.

As shown and described, the carriage assembly 136 may include three guide wheels (i.e., the pair of guide wheels 216 and the top guide wheel 226) that are spaced from each other by approximately 90 degrees. The configuration of the guide wheels of the carriage assembly 136 creates multiple contact points on the longitudinal member 224 of the gantry truss 118 that are spaced apart from each other. By creating multiple contact points that are spaced apart, the guide wheels may increase the strength and the stability of the carriage assembly 136.

Figure 3:
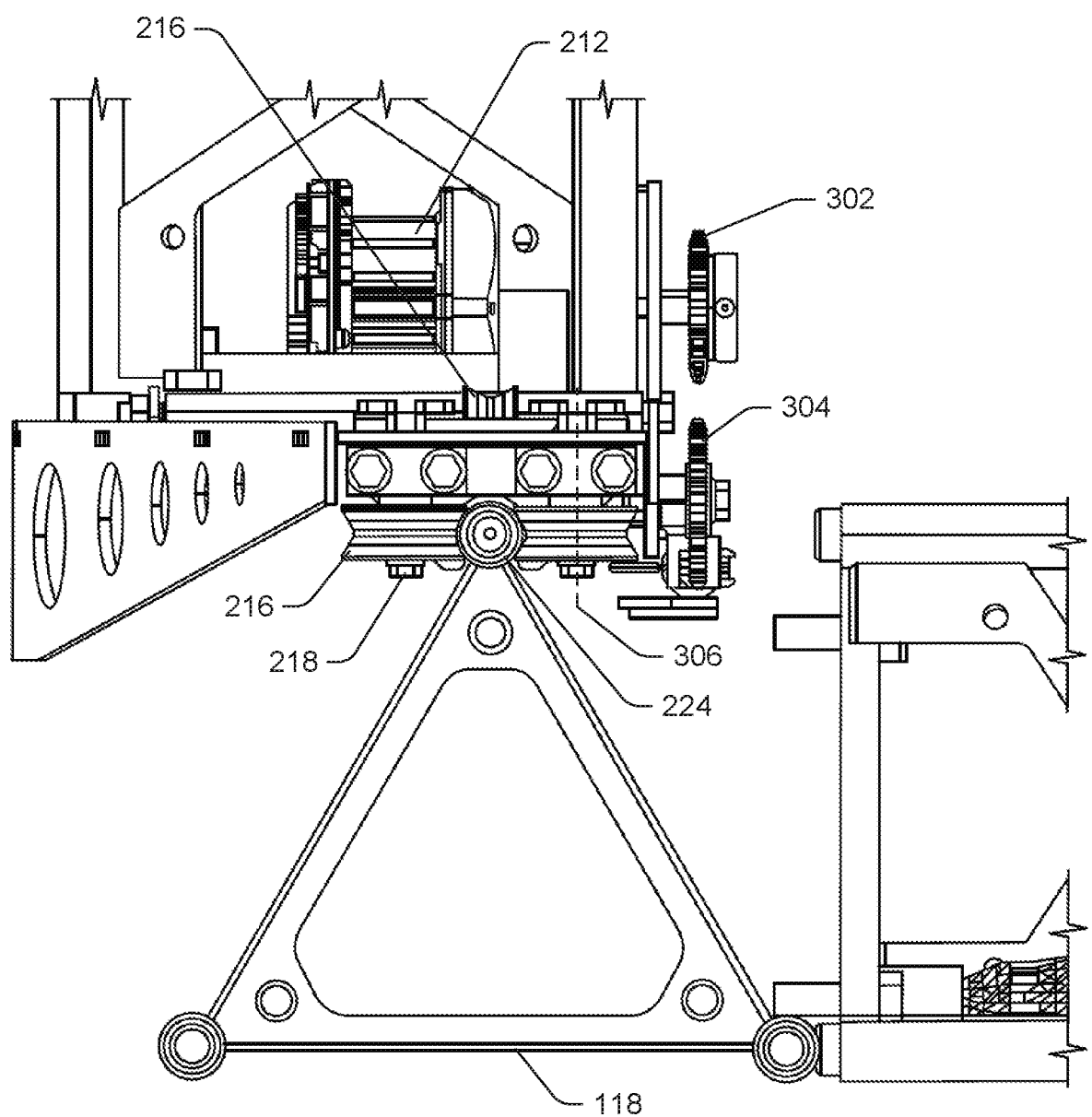
FIG. 3 is a front view of an example gantry carriage assembly of a three-dimensional additive system in accordance with an example of the present disclosure.

FIG. 3 depicts a front view of the carriage assembly 136 of the system 100. As mentioned previously, the carriage assembly 136 includes a motor 212 that is attached to the interior flange 210 of the carriage assembly. As shown in FIG. 3, the motor 212 includes a gear 302 that configured to engage a drive system 304 of the carriage assembly 136 (and/or the system 100) that moves the carriage assembly 136 along the gantry truss 118. Movement of the carriage assembly 136 causes the gantry bridge 114 to move, e.g., in the Y-direction of FIG. 1 thus allowing the conduit 102 to be positioned within the system 100 in a desired location during an additive manufacturing process.

As described previously, the carriage assembly 136 includes a pair of guide wheels 216 disposed on opposite sides from one another across the longitudinal member 224 of the gantry truss 118. The pair of guide wheels 216 may be clamped to either side of the longitudinal member 224 such that the carriage assembly 136 is movable secured to the gantry truss 118. In some examples, the bolts 218 used to secure the pair of guide wheels 216 to the plate 206 may include eccentric bolts. In such examples, when the eccentric bolts are rotated, a lateral position of the pair of guide wheels 216 may be adjusted. As such, a distance between the pair of guide wheels 216 may be increased in order to place the carriage assembly 136 on the gantry truss 118. Once the carriage assembly 136 is placed on the gantry truss 118, the eccentric bolts may be adjusted to decrease a distance between the pair of guide wheels 216, thereby clamping the longitudinal member 224 of the gantry truss 118 therebetween. Furthermore, as mentioned previously, the carriage assembly 136 may include a top guide wheel 226 that is configured to contact a top surface of the longitudinal member 224. In some examples, the configuration of the pair of guide wheels 216 may provide approximately 270 degrees of contact on the longitudinal member 224. Furthermore, as shown in FIG. 3, the pair of guide wheels 216 may each include an axis of rotation 306 that is substantially vertical. As such, the pair of guide wheels 216 may be disposed on either side the longitudinal member 224 of the gantry truss 118. Additionally, if the system 100 is placed on an uneven or sloped surface, the axis of rotation 306 may be normal to the surface on which the system 100 rests.

Figure 4:
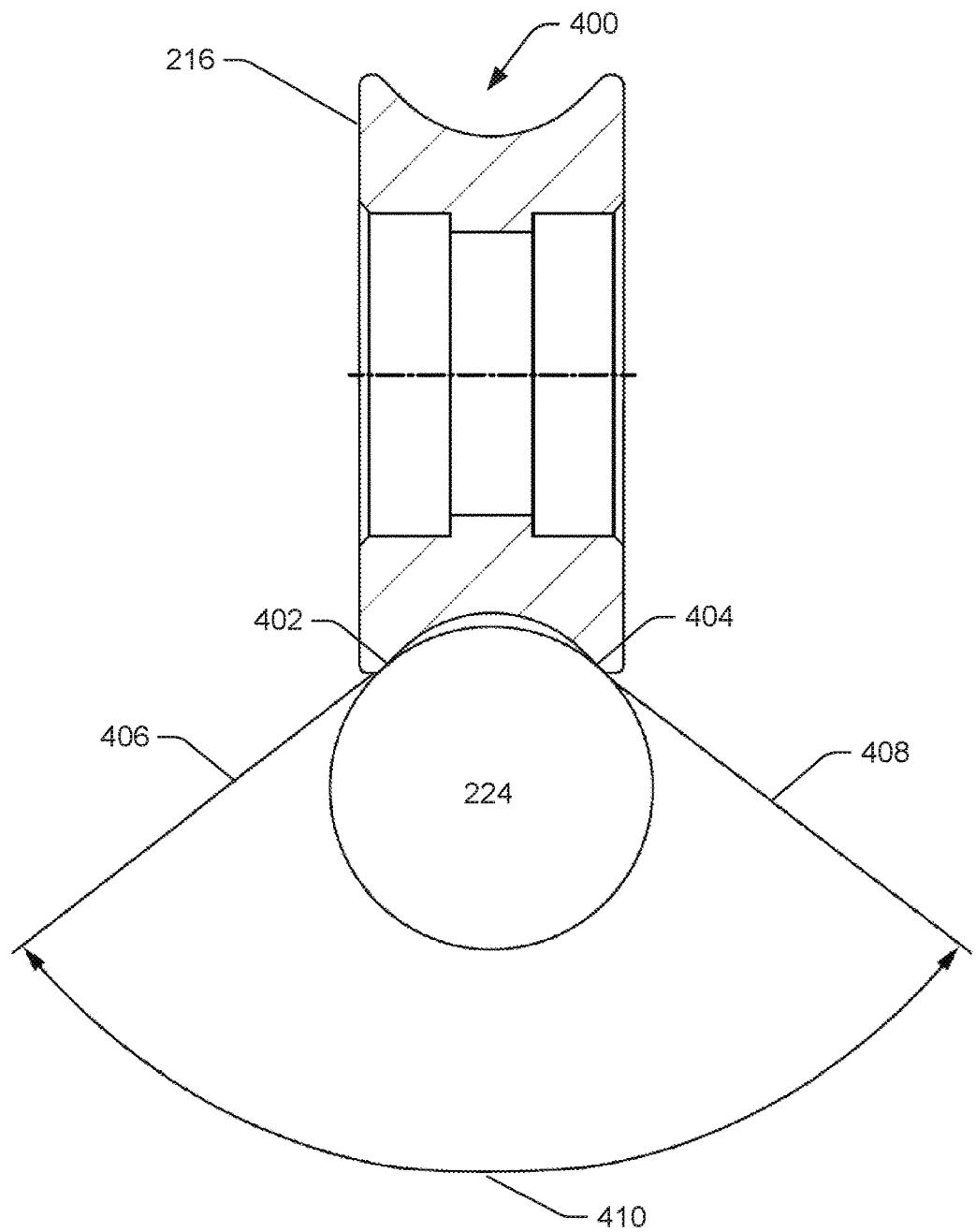
FIG. 4 is an illustration of an example guide wheel profile as the guide wheel engages a longitudinal member of an example gantry truss in accordance with an example of the present disclosure.

FIG. 4 is an illustration of an example profile 400 of a guide wheel 216 as the guide wheel 216 engages a longitudinal member 224 of a gantry truss 118. In some examples, each of the guide wheels described herein may include the profile shown and described in FIG. 4. As shown in FIG. 4, the guide wheel 216 includes a concave wheel profile. In some examples, a shape of the wheel profile may be configured such that the guide wheel 216 contacts the longitudinal member 224 at two points of contact that are substantially tangential to a surface of the longitudinal member 224. Typically, wheel profiles may be shaped to correspond with a shape of a rail, longitudinal member, or other guide rail structure. For example, traditional guide wheels may include a wheel profile that matches an outside diameter of a longitudinal member on which the wheel is movable. However, by shaping the wheel profile to correspond with the guide rail, the guide wheel may experience uneven and/or accelerated wear due to scrubbing or other forces. Alternatively, by including a wheel profile such that includes two points of contact that are substantially tangential to a surface of the longitudinal member 224, the wheel profile of the guide wheel 216 may reduce wear on the guide wheel 216 and/or the longitudinal member 224 on which one or more guide wheels 216 travel. Furthermore, the particular wheel profile shown and described herein may cause the guide wheel 216 and the longitudinal member 224 to wear at a substantially similar rate, thereby increasing a useful life of the guide wheels 216 and/or the gantry truss 118.

Furthermore, the profile 400 of the guide wheel 216 may create a first contact surface 402 and a second contact surface 404 that are configured to contact the longitudinal member 224. The first contact surface 402 may extend in a direction that is substantially tangential to a point of contact on the longitudinal member 224 that the first contact surface 402 contacts. Furthermore, the second contact surface 404 may similarly extend in a direction that is substantially tangential to a point of contact on the longitudinal member 224 that the second contact surface 404 contacts. In FIG. 4, a first direction of extension of the first contact surface 402 is depicted by line 406, while a second direction of extension of the second contact surface 404 is depicted by line 408. In some examples, an angle 410 between the first direction of extension 406 of the first contact surface 402 and the second direction of extension 408 of the second surface 404 is between approximately 85 degrees and approximately 125 degrees or between approximately 95 degrees and approximately 115 degrees. Furthermore, in some examples the angle 410 may be approximately 105 degrees. As mentioned previously, such a guide wheel 216 profile 400 may reduce wear and/or extend a useable life of the guide wheels and/or the gantry trusses 118.

Figure 5:
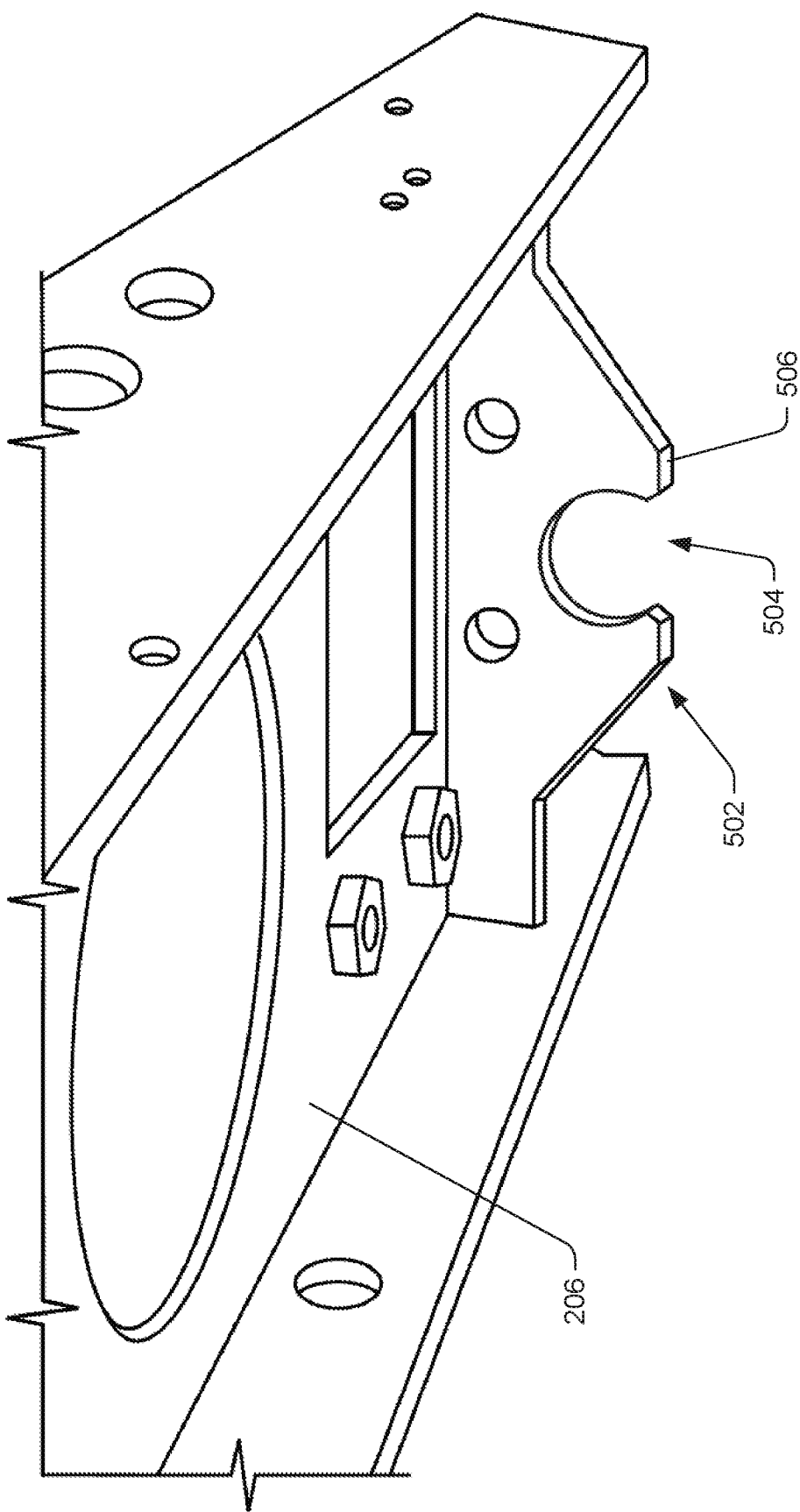
FIG. 5 is a bottom perspective view of an example support plate of an example gantry carriage assembly in accordance with an example of the present disclosure.

FIG. 5 is a bottom perspective view of the plate 206 of the carriage assembly 136 of the system 100 as shown and described previously with respect to FIGS. 1-3. In addition to the features previously described, the plate 206 also includes a tab 502 that is shaped to correspond with the longitudinal member 224 of the gantry truss 118 such that the tab 502 at least partially surrounds the longitudinal member 224. The tab 502 may be shaped such that the tab 502 includes a certain clearance around the longitudinal member 224. For example, the tab 502 may include an arcuate opening 504 that circumscribes the longitudinal member 224. In some examples, the clearance may be indicative that the guide wheels 216 are adjusted correctly via the eccentric bolts shown and described previously. For example, if the guide wheels 216 are not properly adjusted, the tab 502 may contact a surface of the longitudinal member 224. Alternatively, if the guide wheels 216 are properly adjusted, the tab 502 may include a substantially uniform clearance around the longitudinal member 224.

The tab 502 further includes prongs 506 that extend below the longitudinal member. Furthermore, the prongs 506 may be spaced from one another such that the arcuate opening 504 wraps at least partially around the longitudinal member 224. As such, the tab 502 may further act as a failsafe if a guide wheel 216 fails (i.e., breaks, loosens, etc.) by preventing the carriage assembly 136 from lifting off the longitudinal member 224. Furthermore, the tab 502 may prevent the carriage assembly 136 from derailing from the gantry truss 118, thereby preventing failure of the system 100. For example, if one of the guide wheels, described previously, fails (e.g., breaks or is otherwise inoperable), the tab 502 may maintain the carriage assembly 136 on a gantry truss 118. In some examples, if the carriage assemblies 136 is derailed from the gantry frame 116, the derailment may cause damage to other components of the system 100 such as the gantry bridge 114, the gantry frame 116, the structure, or other components. Furthermore, the tab 502 may prevent derailment, thereby protecting operators or other people that may be proximate the system 100 before, during, or after an additive manufacturing process.

INDUSTRIAL APPLICABILITY

The present disclosure provides an improved three-dimensional ("3D") additive system (referred to herein as "the system"). The system described herein is used to construct various types of structures, portions of structure(s), or other products utilizing additive manufacturing processes. Typically, additive manufacturing processes deposit an extrudable building material in vertically stacked layers to form the structure and/or portions thereof. As such, the system requires a support structure that is capable of supporting a gantry bridge that moves along the support structure during an additive manufacturing process. The system described herein includes a gantry carriage assembly and guide wheels thereof that are capable of supporting a gantry bridge during an additive manufacturing process, while reducing wear and increasing a useable life of components of the system.

According to some embodiments, a system 100 may include a gantry frame assembly 116, a gantry bridge assembly 114, and a gantry carriage assembly 136 secured to a gantry truss 118 of the gantry frame assembly 116. The gantry carriage assembly 136 is configured to support the gantry bridge assembly 114 and is configured to move the gantry bridge assembly 114 along the gantry frame assembly 116. The gantry carriage assembly 136 includes a support plate 206 to which the gantry bridge assembly 114 is attached. The gantry carriage assembly 136 also includes guide wheels 216 attached to the support plate. The guide wheels 216 are disposed on either side of a longitudinal member 224 of a gantry truss 118, thereby clamping the longitudinal member 224 between the guide wheels 216. The guide wheels 216 include a wheel profile that is shaped such that a single guide wheel includes at least two points of contact on the longitudinal member 224 that are tangential to a surface of the longitudinal member 224.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A gantry carriage assembly movably secured to a gantry truss, the gantry carriage assembly comprising:
   a support plate having a first end and a second end;
   first guide wheels secured to the first end of the support plate, the first guide wheels including a first pair of guide wheels disposed opposite from one another and configured to accommodate a longitudinal member of the gantry truss therebetween;
   second guide wheels secured to the second end of the support plate opposite the first end, the second guide wheels including a second pair of guide wheels disposed opposite from one another and configured to accommodate the longitudinal member of the gantry truss therebetween; and
   a tab extending from a bottom of the support plate, the tab including:
      an arcuate opening that circumscribes at least a portion of the longitudinal member, and
      a pair of prongs that extends below the longitudinal member and at least partially wraps around the longitudinal member, the pair of prongs preventing the carriage assembly from derailing off the longitudinal member.

2. The gantry carriage assembly of claim 1, wherein individual guide wheels of the first guide wheels and the second guide wheels are disposed to rotate about a vertical axis of rotation.

3. The gantry carriage assembly of claim 1, wherein individual guide wheels of the first guide wheels and the second guide wheels have a concave wheel profile that is at least partially rounded between a first contact surface and a second contact surface that are configured to contact the longitudinal member.

4. The gantry carriage assembly of claim 1, wherein individual guide wheels of the first guide wheels and the second guide wheels include a wheel profile such that the individual guide wheels contact the longitudinal member at two points of contact that are tangential to a surface of the longitudinal member.

5. The gantry carriage assembly of claim 1, wherein an individual guide wheel of the first guide wheels and the second guide wheels includes a first contact surface and a second contact surface configured to contact the longitudinal member, wherein an angle between the first contact surface and the second contact surface is between 85 degrees and 125 degrees.

6. The gantry carriage assembly of claim 1, wherein the first guide wheels and the second guide wheels are configured to accommodate a longitudinal member of a triangular truss having three longitudinal members.

7. The gantry carriage assembly of claim 1, further comprising a top guide wheel secured to a top portion of the support plate such that the top guide wheel contacts a top surface of the longitudinal member.

8. A gantry carriage assembly moveable along a gantry frame assembly and configured to support a gantry bridge, the gantry carriage assembly comprising:
   a support plate slidable along the gantry frame assembly and configured to support the gantry bridge, the support plate having a first end and a second end;
   a first pair of guide wheels secured to the first end of the support plate and configured to rotate relative to the support plate, the first pair of guide wheels defining a space therebetween configured to receive an outer surface of a longitudinal member of the gantry frame assembly;
   a second pair of guide wheels secured to the second end of the support plate, and configured to rotate relative to the support plate, the second pair of guide wheels defining a space therebetween configured to receive the outer surface of the longitudinal member, wherein the first pair of guide wheels and the second pair of guide wheels include a wheel profile shaped such that at least one guide wheel includes at least two points of contact on the longitudinal member, the at least two points of contact being tangential to a surface of the longitudinal member, respectively; and
   a tab extending from a bottom of the support plate, the tab including:
      an arcuate opening that circumscribes at least a portion of the longitudinal member, and
      a pair of prongs that extends below the longitudinal member and at least partially wraps around the longitudinal member, that the pair of prongs preventing the carriage assembly from derailing off the longitudinal member.

9. The assembly of claim 8, wherein individual guide wheels of the first pair of guide wheels and the second pair of guide wheels have a concave wheel profile that is at least partially rounded between a first contact surface and a second contact surface that are configured to contact the longitudinal member.

10. The assembly of claim 8, wherein the at least one guide wheel includes a first contact surface and a second contact surface configured to contact the longitudinal member, wherein an angle between the first contact surface and the second contact surface is between 85 degrees and 125 degrees.

11. The assembly of claim 8, wherein the first guide wheels and the second guide wheels are configured to accommodate a longitudinal member of a triangular truss having three longitudinal members.

12. The assembly of claim 8, further comprising a top guide wheel secured to the support plate such that the top guide wheel extends below a plane defined by the support plate, the top guide wheel configured to rest on a top surface of the longitudinal member.

13. The assembly of claim 8, wherein the support plate is further configured to secure a vertical truss of the gantry bridge.

14. A three-dimensional additive construction system comprising:
- a gantry frame assembly including one or more gantry trusses;
- a gantry bridge assembly including a trolley moveable along the gantry bridge, the trolley being configured to secure a supply hose thereto; and
- a gantry carriage assembly secured to a gantry truss of the one or more gantry trusses such that the gantry carriage assembly is moveable along the gantry truss, the gantry carriage assembly including:
  - a support plate having a first end and a second end,
  - first guide wheels secured to the first end of the support plate, the first guide wheels including a first pair of guide wheels disposed opposite from one another and configured to accommodate a longitudinal member of the gantry truss therebetween,
  - second guide wheels secured to the second end of the support plate opposite the first end, the second guide wheels including a second pair of guide wheels disposed opposite from one another and configured to accommodate the longitudinal member therebetween, and
  - a tab extending from a bottom of the support plate, the tab including:
    - an arcuate opening that circumscribes at least a portion of the longitudinal member, and
    - a pair of prongs that extends below the longitudinal member and at least partially wrap around the longitudinal member, the pair of prongs preventing the carriage assembly from derailing off the longitudinal member.

15. The system of claim 14, wherein the first guide wheels and the second guide wheels include at least one guide wheel having a wheel profile such that the at least one guide wheel contacts the longitudinal member at two points of contact that are tangential to a surface of the longitudinal member.

16. The system of claim 14, wherein the first guide wheels and the second guide wheels include at least one guide wheel having a first contact surface and a second contact surface that contact the longitudinal member, wherein an angle between the first contact surface and the second contact surface is between 85 degrees and 125 degrees.

17. The system of claim 14, wherein the one or more gantry trusses are triangular trusses.

18. The system of claim 14, wherein the gantry carriage assembly is slidable along the longitudinal member of the gantry truss via the first guide wheels and the second guide wheels.

19. The system of claim 14, wherein the gantry carriage assembly further includes a top guide wheel secured to a top portion of the support plate such that the top guide wheel contacts a top surface of the longitudinal member.

* * * * *